United States Patent Office 3,850,920
Patented Nov. 26, 1974

---

3,850,920
N-HALO-3-MORPHOLINONE
Wilhelm E. Walles, Midland, Mich., assignor to The Dow Chemical Company, Midland, Mich.
No Drawing. Original application Oct. 30, 1967, Ser. No. 679,227, now Patent No. 3,591,601, dated July 6, 1971. Divided and this application Jan. 4, 1971, Ser. No. 103,918
Int. Cl. C07d 87/30
U.S. Cl. 260—247.7 J 2 Claims

ABSTRACT OF THE DISCLOSURE

The N-chloro and N-bromo derivatives of 2-oxazolidinone, 2-morpholinone, 2-oxazinidinone, and the corresponding hydrocarbon substituted compounds are prepared by halogenation, using a halogenated isocyanuric acid as the halogenating reagent. These N-halo compounds are germicides and bleaching agents.

---

CROSS-REFERENCE TO RELATED APPLICATION

This is a division of my copending application Ser. No. 679,227, filed Oct. 30, 1967 now U.S. Pat. 3,591,601, dated July 6, 1971.

BACKGROUND OF THE INVENTION

This invention relates to new chemical compounds and to a process whereby these and similar compounds are prepared. It relates particularly to certain new N-halo heterocyclic imides and to a method for preparing these and analogous known compounds.

SUMMARY OF THE INVENTION

The new compounds of this invention are N-halo oxygen-nitrogen heterocyclic imides having the structure

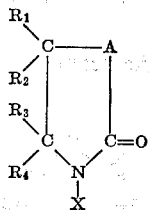

wherein A is —O—, —CH$_2$O—, or —OCH$_2$—; X is chlorine or bromine; R$_1$ and R$_3$ are each hydrogen, alkyl of 1–4 carbon atoms, or phenyl; and R$_2$ and R$_4$ are each hydrogen or alkyl of 1–4 carbon atoms. This structure represents the N-chloro and N-bromo derivatives of 2-oxazolidinones, 2-morpholinones, and 2-oxazinidinones. These halogenated imides are useful sources of positive halogen for use in germicidal, bleaching, and chemical reaction applications.

These compounds and analogous halogenated secondary carboxamides or carboximides, hereinafter all referred to as carboxamides, all of which have the general structure

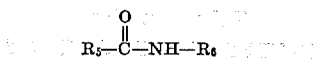

where R$_5$ and R$_6$ are each alkyl radicals, or R$_5$ and R$_6$ together form a heterocyclic ring, are conveniently prepared by reacting the corresponding non-halogenated carboxamide with a halogenated isocyanuric acid as the source of halogen. Mono-, di-, or trihalogenated isocyanuric acid, for example, chloroisocyanuric acid, dichloroisocyanuric acid, trichloroisocyanuric acid, bromoisocyanuric acid, or tribromoisocyanuric acid can be used as the halogenating reactant. The exothermic reaction can be carried out merely by contacting the reagents at ambient temperature in a liquid medium.

DETAILED DESCRIPTION

An inert organic solvent such as an aliphatic or aromatic hydrocarbon or their chlorinated derivatives may be employed as the reaction medium or the carboxamide reactant itself, when it is a liquid, may serve. The cyanuric acid byproduct is relatively insoluble and so is easily separated by filtration of the reaction mixture. Since the halogenated cyanuric acid reacts to the extent that it is present or until halogenation of the carboxamide is complete, the proportions of reactants are not critical, but it is usually most convenient to employ at least one equivalent of halogen as contained in the halogenated isocyanuric acid per mole of amide group to be halogenated.

Halogenation may also be accomplished by known means, e.g., by reacting the carboxamide with a hypohalite or free halogen in the presence of a base. However, the above-described transhalogenation method offer good yields and is generally more convenient to use.

This prior art process usually involves a distillation to separate the product and so it is unsuitable for making the present compounds which are thermally unstable. The N-bromo amides can also be prepared by reacting the corresponding N-chloro amide with an inorganic bromide in a water-immiscible organic solvent system as described in Example 8. This latter process is further described and claimed in my copending application Ser. No. 679,254, filed Oct. 30, 1967, now abandoned.

The new compounds of this invention are useful in various applications where positive halogen is of advantage. Thus, these compounds can serve as active ingredients in sanitizing and bleaching compositions. They can be used as initiators of polymerizations such as those taught by Taber in U.S. 3,061,593. They are also useful, particularly the compounds where A in the general formula is oxygen, as reagents causing rapid decomposition reactions when contacted with alcohols, alkylamines, and dialkyl sulfoxides as taught in copending application of Walles and Nagy, Delayed Action Explosives, Ser. No. 679,208, filed Oct. 30, 1967, now U.S. Pat. 3,468,674. The unusually high solubility of these new compounds in chlorinated solvents makes them of particular interest in several of the above applications.

Example 1

A mixture of 35.7 g. of 5-methyl-2-oxazolidinone and 27.4 g. of trichloroisocyanuric acid was stirred together in a glass beaker. The mixture warmed rapidly to about 98° C., then cooled to form a thick slurry of fine white crystals. The slurry was filtered to obtain 26 g. of a clear yellow liquid. Theh filter cake was washed with benzene and the benzene was evaporated from the washings to obtain another 9 grams of the same liquid. The filter cake was dried and identified as pure cyanuric acid. The liquid product was identified by infrared spectroscopic examination and elemental analysis as N-chloro-5-methyl-2-oxazolidinone. Found (average of two determinations): 29.5% C, 3.36 H, 12.1% N, 28.8% Cl. Calculated: 29.6% C, 3.32% H, 11.5% N, 29.2% Cl. This compound had a freezing point of 22° C. and it decomposed explosively at about 160° C.

Example 2

To a stirred slurry of 200 g. of trichloroisocyanuric acid in 500 ml. of methylene chloride there was added dropwise 174.2 g. of 5-methyl-2-oxazolidinone. The temperature of the reaction mixture rose from about 25° C. to 44° C. during the addition. The fine white precipitate of cyanuric acid was filtered from the reaction mixture and the methylene chloride was evaporated under reduced pressure to obtain 225 g. of clear, nearly colorless N-chloro-5-methyl-2-oxazolidinone.

Example 3

The procedure of Example 2 was followed to react 99.2 g. of 5-ethyl-2-oxazolidinone with 100 g. of trichloroisocyanuric acid in 400 ml. of methylene chloride. A yield of 114 g. of N-chloro-5-ethyl-2-oxazolidinone was isolated and identified as described above. The product was a clear, nearly colorless liquid which decomposed at 120–130° C.

Found (average of two determinations): 39.4% C, 5.15% H, 9.85% N, 23.5% Cl. Calculated: 40.1% C, 5.39% H, 9.36% N, 23.7% Cl.

Example 4

By the procedure of Examples 2 and 3, 60 grams of 2-oxazolidine was reacted with 80 g. of trichloroisocyanuric acid in methylene chloride. After the solid cyanuric acid was filtered from the reaction mixture, the filtrate was freed of methylene chloride by evaporation to obtain 82.0 g. of white solid, m.p. 65–70° C., decomposed at 175–180° C. This product was identified as before as N-chloro-2-oxazolidinone. Elemental analysis showed (average of two determinations): 29.5% C, 3.36% H, 12.14% N, 28.8% Cl. These results are very close to the theoretical values.

Example 5

A slurry of 100 g. of trichloroisocyanuric acid in 400 ml. of methylene chloride was stirred while 87.1 g. of 3-morpholinone was added portionwise over about one hour. The reaction mixture temperature rose to about its reflux point during the addition. The chlorinated product was isolated as in the foregoing examples to obtain 114 g. of white crystals, identified by infrared spectroscopic examination and elemental analysis as N-chloro-3-morpholinone. This product melted at 100–105° C. and decomposed explosively when heated to 115° C.

Example 6

Upon addition of 97.4 g. of caprolactam to a stirred slurry of 100 g. of trichloroisocyanuric acid in 300 ml. of benzene, the temperature rose to a maximum of 54° C. After the mixture had stirred for one hour, the solid cyanuric acid and unreacted trichloroisocyanuric acid were filtered off and the benzene was distilled from the filtrate under reduced pressure. The product thereby obtained was a yellow oil, weight 98 g. The material decomposed at 120–130° C. It was identified by the usual analytical means as N-chlorocaprolactam.

Example 7

The procedure of Example 5 was employed to react 73.2 g. of 2-pyrrolidinone with 100 g. of trichloroisocyanuric acid in 400 ml. of methylene chloride. The filtrate from the resulting reaction mixture was heated to 40° C. under reduced pressure to remove the solvent thereby obtaining as a residue 96 g. of white crystals which were identified by the usual infrared spectroscopic examination and elemental analysis as N-chloro-2-pyrrolidinone, m.p. 33–37° C., decomposed at 130° C.

Example 8

A slurry of 232 g. of trichloroisocyanuric acid in 1000 g. of methylene chloride was stirred while 100 g. of 4-methyl-2-imidazolidinone in 800 g. of methylene chloride was added, the temperature of the mixture rising to 39° C. during the addition. Upon working up the reaction mixture as previously described, there was obtained 114 g. of chloro-4-methyl-2-imidazolidinone, a clear yellow oil with an odor of free chlorine. The impure product was unstable and exploded on standing for several hours.

Example 9

A solution of 67.5 g. of N-chloro-5-methyl-2-oxazolidinone in 200 ml. of methylene chloride was vigorously stirred with a solution of 51.5 g. of sodium bromide in 100 ml. of water. After ten minutes of agitation, the layers were separated and the water layer was discarded. Evaporation of solvent from the methylene chloride layer yielded 75 g. of N-bromo-5-methyl-2-oxazolidinone as pure white crystals, m.p. 55° C. The identity of the product was confirmed by elemental analysis and infrared spectroscopic examination.

According to a procedure such as shown by the foregoing examples, N-chloro-5-phenyl-2-oxazolidinone is prepared by reacting the non-halogenated compound with trichloroisocyanuric acid. In a similar way, there are obtained N-halo compounds such as N-chloro-4,5-dimethyl-2-oxazolidinone,
N-bromo-4,5-diphenyl-2-oxazolidinone,
5-butyl-N-bromo-2-oxazolidinone,
N-chloro-2-oxazinidinone,
N-bromo-5,6-dimethyl-2-oxazinidinone,
N-bromo-4-ethyl-3-morpholinone and the like by transhalogenation of the parent compounds as shown above. These compounds have physical and chemical properties closely similar to those of the related compounds shown in the examples.

In the same way, aliphatic or open chain secondary carboxamides such as N-methylacetamide, N-ethylbutyramide, and the like are converted to their N-chloro and N-bromo derivatives as shown in Example 10.

Example 10

One gram mole (73.0 g.) of N-methylacetamide was carefully melted. To the liquid there was added the equivalent amount (77.0 g.) of trichloroisocyanuric acid, causing the mixture to warm up to 52° C. Insoluble white cyanuric acid precipitated and was separated by filtration to leave as the filtrate 49.3 g. of essentially pure N-chloro-N-methylacetamide, a clear liquid which was further purified by distillation at reduced pressure. The identity of the product was confirmed by elemental analysis, infrared spectroscopic analysis, and titration for positive chlorine.

I claim:
1. A compound of the formula

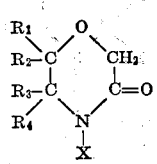

wherein X is chlorine or bromine, $R_1$ and $R_3$ are each hydrogen, a tertiary alkyl of 1–4 carbon atoms, or phenyl, and $R_2$ and $R_4$ are each hydrogen or a tertiary alkyl of 1–4 carbon atoms.

2. The compound of Claim 1 wherein $R_1$, $R_2$, $R_3$, and $R_4$ are each hydrogen and X is chlorine and the compound is N-chloro-3-morpholinone.

References Cited

UNITED STATES PATENTS

| | | | |
|---|---|---|---|
| 2,013,791 | 9/1935 | Sachs | 260—61 |
| 2,472,361 | 6/1949 | Arsem | 260—583 |
| 2,971,959 | 2/1961 | Waugh et al. | 260—309.5 |
| 2,971,960 | 2/1961 | Waugh et al. | 260—309.5 |

DONALD G. DAUS, Primary Examiner

J. TOVAR, Assistant Examiner

U.S. Cl. X.R.

252—102, 186; 260—244 R, 307 C; 424—248

UNITED STATES PATENT OFFICE
CERTIFICATE OF CORRECTION

Patent No. 3,850,920  Dated November 26, 1974

Inventor(s) Wilhelm E. Walles

It is certified that error appears in the above-identified patent and that said Letters Patent are hereby corrected as shown below:

Col. 2, line 39, delete "3,468,674" and insert --3,465,674--

Col. 2, line 57, following "3.36" insert --%--

Signed and sealed this 1st day of April 1975.

(SEAL)
Attest:

RUTH C. MASON
Attesting Officer

C. MARSHALL DANN
Commissioner of Patents
and Trademarks